Dec. 30, 1969  C. A. CADY  3,487,284
METHOD AND APPARATUS FOR CHARGING STORAGE BATTERIES
Filed Dec. 22, 1966  3 Sheets-Sheet 1

INVENTOR
CHARLES A. CADY
BY
Kenway, Jenney & Hildreth
ATTORNEYS

INVENTOR
CHARLES A. CADY
BY
Keneway, Jenney & Hildreth
ATTORNEYS

Dec. 30, 1969

C. A. CADY 3,487,284

METHOD AND APPARATUS FOR CHARGING STORAGE BATTERIES

Filed Dec. 22, 1966

INVENTOR
CHARLES A. CADY
BY
Kenway, Jenney & Hildreth
ATTORNEYS

United States Patent Office 3,487,284
Patented Dec. 30, 1969

3,487,284
METHOD AND APPARATUS FOR CHARGING STORAGE BATTERIES
Charles A. Cady, 42 Shaw Drive, Wayland, Mass.
Filed Dec. 22, 1966, Ser. No. 604,014
Int. Cl. H02j 7/00; H01m 45/04
U.S. Cl. 320—20
5 Claims

ABSTRACT OF THE DISCLOSURE

A method comprising the steps of connecting and disconnecting a charging source and a battery at intervals determined by the condition of the battery as measured by the behavior of the battery voltage as a function of time. Apparatus including a switch for connecting and disconnecting the source, a voltage sensing bridge to be connected across the battery and comprising a Zener diode operated in the constant current mode, and a switch control circuit operated by the bridge. In one embodiment, a bridge signal offsetting circuit is operated when the switch is closed. The full specification should be consulted for an understanding of the invention.

DISCLOSURE

My invention relates to storage batteries, and particularly to a novel method and apparatus for charging and maintaining the charge on storage batteries.

Storage batteries for such standby service as emergency lighting systems, engine starting and ignition systems, signalling systems, and the like, are conventionally provided with various forms of apparatus for the purpose of recharging and maintaining the charge on the batteries. Such apparatus conventionally comprises some form of current or voltage control apparatus for measuring the state of the battery and supplying charging current when the battery has discharged to a predetermined potential. For alkaline batteries, such apparatus is frequently supplemented by a timing device which will continue the charge after a predetermined voltage has been reached, as it is difficult to measure the approach of such batteries to a fully charged condition. Particularly for batteries for long standby service, it is also conventional to provide trickle charging circuits for supplying a relatively small continuous charging current sufficient to maintain the battery at a useful operating potential during storage by replenishing the charge dissipated internally and externally. It has been found that batteries which customarily stand idle for a long period can become partially polarized due to an accumulation of air or gas bubbles on the surface of the plates. Such polarization reduces the capacity of the battery and increases its internal resistance. Polarization will occur in batteries whether or not they are subjected to a trickle charge, as the relatively low current levels employed in trickle charging are insufficient to dislodge gas or air bubbles as they are formed. A particular object of my invention is to minimize polarization of this kind. Other objects of my invention are to increase the service life of storage batteries, to reduce the effective internal resistance of storage batteries in service, and to reduce the water consumption of storage batteries.

Briefly, the above and other objects of my invention are attained by a novel process of battery charging of my invention, in which conventional trickle charging plays no part. Basically, the process consists in supplying pulses of current at a level typical of high rate charging with constant current, and determining the rate at which the pulses are supplied in dependence on the rate of discharge of the battery. I have found that in this manner a battery can be maintained in substantially full charge over extended periods of time, that it will exhibit a longer service life and a lower internal resistance than is typical of conventionally charged batteries, and that polarization is substantially eliminated.

In accordance with one embodiment of my invention, suitable for use with lead-acid batteries, I simply provide means for sensing the voltage of a storage battery, and apparatus controlled by the voltage measuring means for supplying pulses of current to the battery until the voltage reaches a predetermined value. If the apparatus is connected to a battery that is substantially discharged, the pulses will be supplied at a continuous rate over a period analogous to the conventional high charging rate period in conventional battery charging until the voltage control point is first reached. As is well known, a battery will accept such a high rate charge during the early part of its recharge cycle without gassing. During this early charging period, at any given average charging rate, the battery terminal voltage will not change significantly. As the charge is increased, a point will be reached at which the high charging current will cause gassing, and an abrupt rise in battery terminal voltage. This point may represent as much as 90 percent of full charge for a lead-acid storage battery. When the voltage rises to the predetermined level, the pulse supply is cut off. Initially, the battery potential will then fall relatively rapidly below the control point, and pulses will again be supplied. As the battery becomes more and more fully charged, the rate of decay of the terminal voltage after the pulse source has been cut off will decrease, so that the number of pulses supplied will be less and less per unit time as the battery approaches full charge. However, each pulse supplied is at substantially the same current level as the initial high charge, such that gas bubbles that tend to form are dislodged and polariaztion is inhibited. This method of charging is suitable for lead-acid batteries, but is not very useful for alkaline or nickel-cadmium batteries.

In accordance with a second and more efficient embodiment of my invention, the pulse charging source is controlled in dependence on two preselected potentials. One of these corresponds to a level below the gassing point of the battery, and the second corresponds to a point above the gassing potential. When the first and lower potential is reached, the pulse source is turned on, and when the second and higher level is reached, the pulse source is turned off. In this manner, two functions play a part in the control of the battery charging rate. First, the time during which the pulse charging source supplies pulses to the battery is determined by the time it takes the battery voltage to rise from the level at which the pulse source is turned on to the level at which it is turned off. This time is directly related to the condition of the battery, and to its immediate history as determined by the load currents recently supplied. Secondly, the time between pulses of charging current, when the pulse charging circuit is disconnected, is determined by the time it takes the battery voltage to fall from the level at which the pulse source is turned off to the lower level at which it is turned back on. This time is directly related to the internal condition of the battery and to the external load to which it is subjected, including external leakage between its terminals. In this manner, the battery will take from the pulse source just that average rate of current necessary to maintain its charge in dependence on its condition and the demands made upon it.

The method and apparatus of my invention will best be understood in the light of the following detailed description, together with the accompanying drawings, of various illustrative embodiments thereof.

Figure 1:
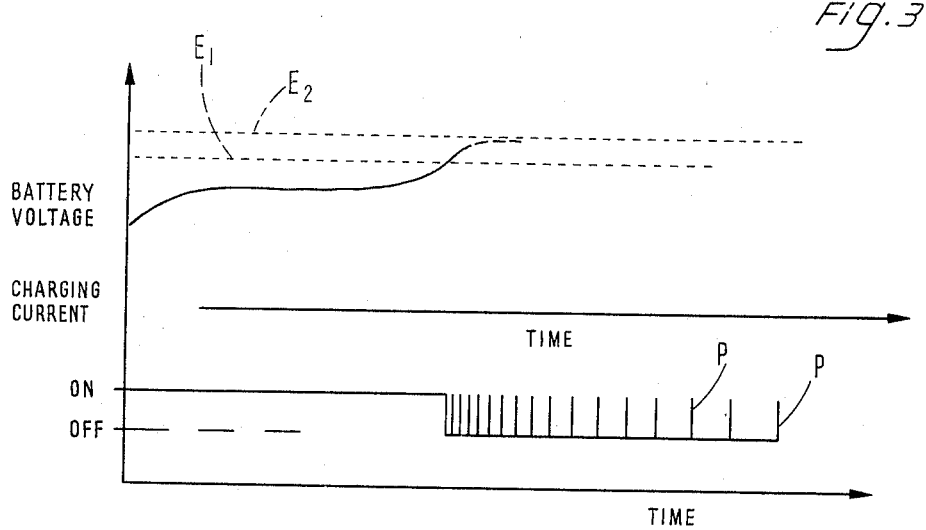
FIG. 1 is a macrograph of battery voltage and charging current as a function of time and illustrating a battery charging process in accordance with one embodiment of my invention.
Figure 2:
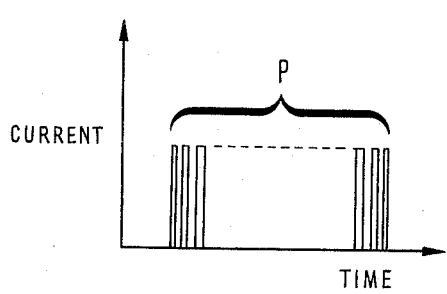
FIG. 2 is a graph of current versus time and illustrating in more detail one of the charging pulses in FIG. 1.

FIG. 1 illustrates the process of charging an initially discharged battery. So long as the battery potential is below a predetermined potential $E_1$, a constant charging current is supplied. This charging current may conveniently be supplied in the form of a continuous series of constant frequency unidirectional pulses of constant current. When the battery potential reaches the voltage $E_1$, current from the source is turned off. Thereafter, each time the battery potential falls slightly below the value $E_1$, a pulse P of charging current will be produced to cause the voltage to rise slightly above the potential $E_1$. There will be slight excursions, not illustrated in FIG. 1, of the battery voltage above and below the potential $E_1$, in dependence on the turn-on and turn-off characteristics of the apparatus used to sense the battery voltage and turn the current pulse source on and off. Each of the charging pulses P may consist of a large number of individual pulses, as illustrated in FIG. 2. The duration of each pulse P may be from a fractional second to several minutes, depending on the state of the battery. Each such pulse P may consist of any desired number of pulses, but either 60 or 120 pulses per second would be typical, as these pulse rates are readily derived from a conventional alternating voltage source.

As illustrated in FIG. 1, the pulses P will decrease in frequency as the battery is charged. The reason is that, while the battery potential $E_1$ will remain substantially constant during the charging process, the energy level available in the battery will rise as the charge is completed. Thus, the time it takes the voltage to fall back from the value at which the current source is turned off to the value at which it is turned on will increase as the charge is increased.

The potential $E_2$ in FIG. 1 illustrates the potential of a fully charged battery. As illustrated by the dotted portion of the curve representing the battery potential, if an attempt was made to charge the battery up to this voltage $E_2$, the rise in potential would be very gradual and would be rather difficult to sense. The voltage $E_1$ represents the last region of the charging curve over which the rise in potential is readily detected, and is thus the practical voltage detection point. For lead-acid storage batteries, the difference between the potential $E_1$ and the potential $E_2$ is such that a practical approach to a fully charged condition by the process illustrated in FIG. 1 can be made.

Figure 3:
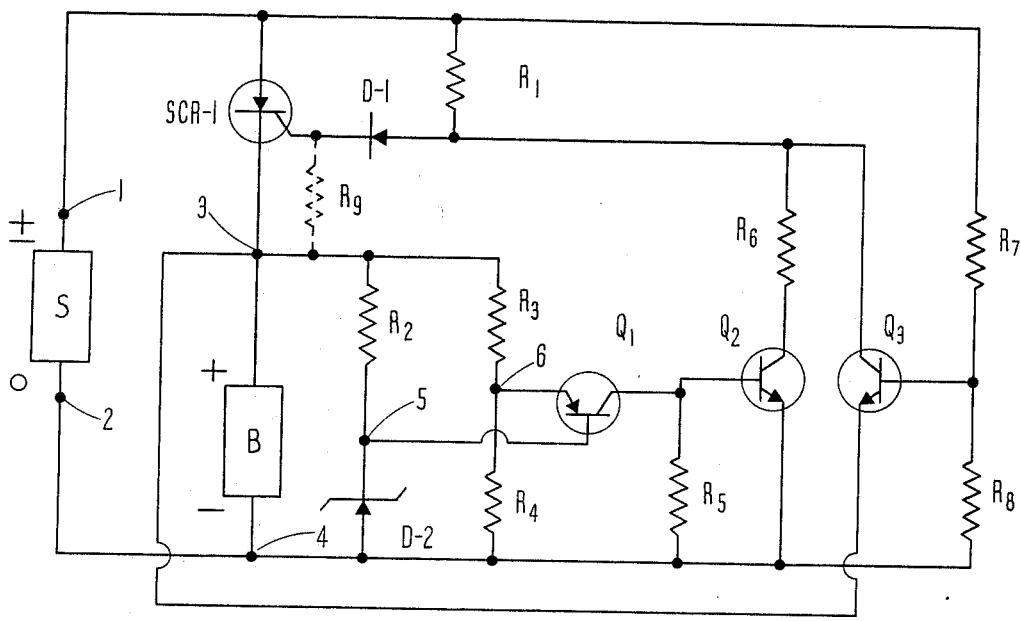
FIG. 3 is a schematic wiring diagram of a battery charging circuit in accordance with a first embodiment of my invention, adapted to carry out the charging process illustrated in FIGS. 1 and 2.

FIG. 3 illustrtaes apparatus in accordance with my invention for charging a battery in accordance with the process shown in FIG. 1. The apparatus comprises a source S of charging current pulses. The source S may be a 110 volt alternating current source, or it may comprise such a source in combination with either a half wave or a full wave rectifier, but in any event should be capable of producing a series of pulses of voltage at an output terminal 1 that are positive with respect to an output terminal 2.

As shown, the terminal 1 of the source S is connected to the anode of a silicon controlled rectifier SCR1. The cathode of the silicon controlled rectifier is connected to a supply terminal 3 that is adapted to be connected to the positive terminal of a battery B to be charged. The terminal 2 of the source S is connected to a supply terminal 4, adapted to be connected to the negative terminal of the battery B.

The gate terminal of the controlled rectifier SCR1 is connected to the terminal 1 of the source S through a resistor R1 in series with a diode D1. A resistance $Rg$ shown in dotted lines between the gate terminal and the cathode of the controlled rectifier SCR1 represents the effective resistance in the gate to cathode path. It is primarily shown for expository purposes, as will appear. However, a physical resistance could be located in the same place if desired to limit the gate-to-cathode voltage applied to the controlled rectifier.

A voltage sensing bridge circuit is connected across the terminals of the battery B. This bridge circuit comprises a first arm including a resistance R2 in series with a Zener diode D2. The Zener diode is selected to break down and conduct current in a reverse direction at a selected relatively small fraction of the voltage across the terminals of the battery B. For example, the diode D2 might be selected to break down at a potential of one-tenth of the nominal voltage of the battery B. It is important that the diode break down at a relatively small fraction of the voltage across the battery, because the diode D2 is employed as a reference voltage source. For that purpose, I have found that it is highly desirable to operate the diode as a substantially constant current device. The reason is that Zener diodes having fixed voltage characteristics at rated current are a readily available and inexpensive item, whereas such diodes typically have highly non-linear and non-uniform characteristics at other currents.

The second arm of the bridge circuit comprises a resistor R3 in series with a resistor R4. The values of the resistors R2, R3, R4, and the breakdown voltage across the diode D2 at rated current, are selected such that the output terminals 5 and 6 of the bridge are essentially at the same potential when the voltage across the terminals of the battery B is slightly below the voltage $E_1$ in FIG. 1, and such that the terminal 6 is slightly positive with respect to the terminal 5 when the potential across the terminals of the battery B is at $E_1$.

The terminals 5 and 6 of the bridge are connected to the base and emitter, respectively, of a pnp transistor Q1. The base-emitter junction of this transistor will therefore be forward-biased when the potential across the terminals of the battery B is equal to $E_1$.

The collector of the transistor Q1 is connected to the negative terminal of the battery B through a resistor R5. Thus, the potential at the collector of the transistor Q1 will be substantially the potential of the negative terminal of the battery B when the transistor Q1 is cut off, and will rise above the potential of the negative terminal of the battery B when the transistor Q1 has its emitter base junction forward-biased and conducts current in the collector-emitter path.

The collector of the transistor Q1 is connected to the base of an npn transistor Q2. The emitter of the transistor Q2 is connected through the supply terminal 4 to the negative terminal of the battery B, and to the terminal 2 of the source S. The collector of the transistor Q2 is connected through a resistor R6 in series with the resistor R1 to the terminal 1 of the source S. The resistors R1 and R6 are proportioned such that with the transistor Q2 shut off, when the terminal of the source S goes positive with respect to the terminal 2, the gate of the controlled rectifier SCR1 will be biased forward with respect to its cathode and gate current will flow, causing the controlled rectifier to be gated on and allowing current to flow from the source S to charge the battery B. If the transistor Q2 is conducting, and the source terminal 1 goes positive, the current flow through the transistor Q2 will bring the potential of the gate of the controlled rectifier SCR1 down below the potential of the cathode, so that the controlled rectifier will be turned off.

The portion of the apparatus of FIG. 3 just described is sufficient to cause charging of a battery in accordance with the process illustrated in FIG. 1. Specifically, when the potential of the battery B is less than the voltage $E_1$, each time the source terminal 1 goes positive with respect to the terminal 2, the controlled rectifier SCR1 will be gated on and cause a pulse of current to flow through the battery B. During this time, the transistor Q1 will be cut off and the transistor Q2 will be cut off. When the potential across the terminals of the battery B reaches $E_1$, the terminal 6 of the bridge will go positive with respect to terminal 5, and the transistor Q1 will be turned on, during the base of the transistor Q2 positive with respect to its emitter and causing that transistor to turn on. The controlled rectifier SCR1 will then be gated off, and will remain off until the battery potential falls below $E_1$. As the time required for the battery potential to fall below the point at which the transistor Q1 will be turned off will depend upon the state of the battery, and the demands to which it is subjected, the on and off times of the charger will automatically be regulated to gradually reduce the average current supplied to the battery B.

While optional in the broader aspects of my invention, the use of a transistor Q3, and resistors R7 and R8 in the apparatus of FIG. 3 contribute to the reliability and service life of the apparatus by protecting the circuit in the event of short circuits across the terminals to which the terminals of the battery B are to be connected. Specifically, that might occur when the source S was connected in the circuit and a short was accidentally mechanically made across the terminals 3 and 4, or it might occur if an abnormally dead battery is connected in the circuit with insufficient residual voltage to limit the flow of charging current. To prevent damage under those circumstances, the transistor Q3, here shown as of the npn type, has its collector connected to the junction of the resistors R1 and R6 and its emitter connected to the cathode of the controlled rectifier SCR1. The base of the transistor Q3 is connected to the terminal 1 of the source S through the resistor R7, and to the terminal 2 of the source S through the resistor R8.

With a battery B in normal condition and the voltage across its terminals in the normal range of extremes between charged and discharged conditions, circuit operation takes place as described above, and the transistor Q3 is cut off. However, should the terminal 3 fall to the potential of the terminal 4, or even substantially below the normal potential, when the terminal 1 of the source S goes positive the base of the transistor Q3 will be made positive with respect to its emitter. The transistor Q3 will then conduct saturation current and will pull the potential of the gate terminal of the controlled rectifier SCR1 substantially to its cathode potential. The controlled rectifier SCR1 is thereby maintained in its non-conducting state, protecting it against otherwise destructive currents that might flow between the terminals 3 and 4.

Various modifications can be made in the apparatus of FIG. 3 without affecting the basic mode of operation. For example, if so desired, the transistor Q2 can be replaced by a controlled rectifier. The cathode of the controlled rectifier would be connected to terminal 4, the anode to the terminal of the resistor R6 to which the collector of the transistor Q2 is connected, and the gate terminal to the collector of the transistor Q1. The controlled rectifier SCR1 could be replaced by a power transistor or other form of electric switch. For low voltage applications, the Zener diode D2 could be replaced by a conventional diode connected for forward conduction.

Figure 4:
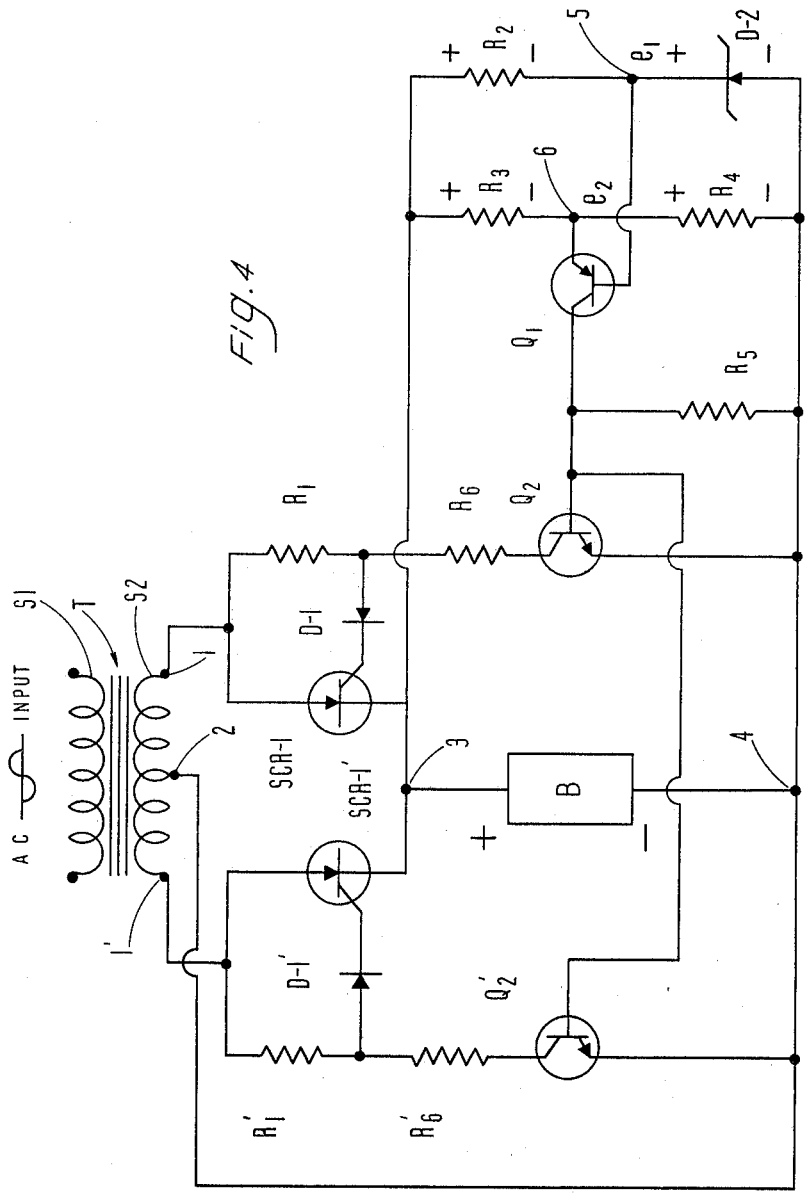
FIG. 4 is a schematic wiring diagram of a battery charging circuit in accordance with a modification of my invention, adapted to carry out the charging process illustrated in FIGS. 1 and 2.

FIG. 4 shows an embodiment of my invention capable of carrying out the process illustrated in FIGS. 1 and 2 and providing for the utilization of the full wave from an alternating current source. As shown, the charging voltage is obtained from a transformer T having a primary winding S1 connected to a suitable source of alternating voltage, and a secondary winding S2 having end terminals labelled 1 and 1' and center-tapped at a terminal labelled 2. As in the apparatus of FIG. 3, terminals 3 and 4 are provided for connecting the apparatus across the terminals of a battery B to be charged.

The circuit connected between the terminals 1 and 2, and at times supplying current to the battery B between the terminals 3 and 4, is identical to the circuit in FIG. 3. The circuit connected between the terminal 1' and 2 is essentially the same circuit, but functions on the opposite half cycle of a voltage applied to the transformer T. The circuits for both half cycles share the voltage sensing network including the bridge circuit comprising resistors R2, R3, R4, the Zener diode D2, and the switching transistor Q1.

In more detail, a charging circuit path extends from terminal 1 of the secondary winding S2 to the anode of a first controlled rectifier SCR1, from the cathode of the controlled rectifier to the battery supply terminal 3, through the battery to the terminal 4, and thence back to the terminal 2. As in the embodiment of FIG. 3, the transistor Q2 controls the controlled rectifier SCR1 by controlling the potential at the junction of the resistors R1 and R6. Specifically, when the source terminal 1 is positive with respect to the terminal 2, the controlled rectifier SCR1 will be gated on when the transistor Q2 is not conducting, and will not be gated on when the transistor Q2 is conducting.

A similar circuit is connected between the terminal 1' of the secondary winding S2 and the center terminal 2. That circuit comprises a controlled rectifier SCR1', a transistor Q2' and resistors R1' and R6' connected in the same way and for the same purpose as the elements identified by corresponding unprimed reference characters. This circuit functions when the source terminal 1' is positive with respect to the center terminal 2.

Both of the circuits just described are under the control of the transistor Q1. As discussed in connection with FIG. 3, when the terminal 6 of the bridge circuit connected across the battery goes positive with respect to the terminal 5, which will occur when the battery potential is at $E_1$ in FIG. 1, the transistor Q1 will conduct. When that occurs, during one half cycle of the source voltage, the transistor Q2 will conduct, and prevent the controlled rectifier SCR1 from conducting. During the next half cycle of the source voltage, the transistor Q2' will be caused to conduct, preventing the controlled rectifier SCR1' from conducting. When the transistor Q1 is not conducting, the controlled rectifier SCR1 will be gated on to supply a charging pulse during one half cycle of the source voltage, and the controlled rectifier SCR1' will similarly supply a current pulse during the next half cycle. It will be apparent that the same result with somewhat fewer components can be obtained by the apparatus of FIG. 3, if the source S in FIG. 3 includes a full wave rectifier.

Figure 5:
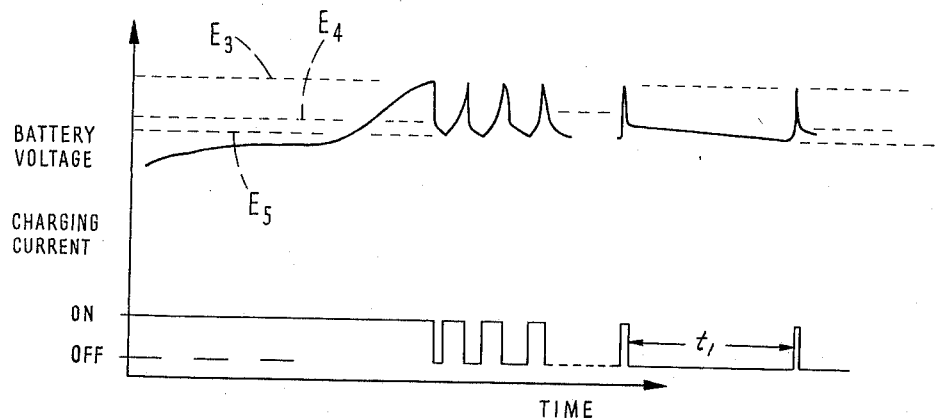
FIG. 5 is a macrograph of battery voltage and charging current versus time illustrating the process of charging a battery in accordance with a second embodiment of my invention.

FIG. 5 illustrates a battery charging process capable of charging a battery in a relatively short time relative to the time required for the process of FIG. 1. The process is also especially applicable to the charging of Edison alkaline batteries and nickel-cadmium batteries.

Charging by a continuous series of equally spaced pulses of constant current is accomplished in the same manner as described in connection with FIG. 1 while the battery is charged over the range at which a relatively high charging current can be supplied without causing gassing. The current is maintained at an average level sufficient to bring the battery voltage above the gassing point. When a predetermined voltage $E_3$, slightly above the gassing point, is reached, the supply of current is interrupted. When the current supply is interrupted, the battery potential will fall quite rapidly to some value $E_4$. The potential will thereafter fall more slowly, at a rate dependent on the condition of the battery, to a selected potential $E_5$ somewhat below the gassing point. At this predetermined potential $E_5$, the supply of charging current is resumed. The potential of the battery will then rise, at a rate dependent upon the state of the battery, until the voltage $E_3$ is again reached. The supply of current is again cut off, whereupon the return of the battery voltage potential $E_4$ is again rapid, but the fall to the potential $E_5$ is at a slightly slower rate.

The battery will continue to cycle in this manner, with the charging times becoming progressively shorter in duration and farther apart as the battery approaches full charge. Eventually, equilibrium will be reached, at which time relatively narrow pulses a fixed time $t1$ apart will be supplied, that are sufficient to maintain the battery in its fully charged state. The time $t1$ will be determined by the condition of the battery and by the load to which it is connected.

The process illustrated in FIG. 5 is particularly applicable to the charging of nickel-cadmium and alkaline batteries, as such batteries typically exhibit a sharp increase of voltage well before they reach full charge, and little discernible change of voltage thereafter. By charging such a battery in the manner shown in FIG. 5, however, full charge will eventually be reached without the use of a conventional timing apparatus and at a rate determined by the actual needs of the battery itself. I have found that in addition to the other benefits achieved by the process of FIG. 5, the battery will require less water to be added during its service life and polarization will be reduced.

Figure 6:
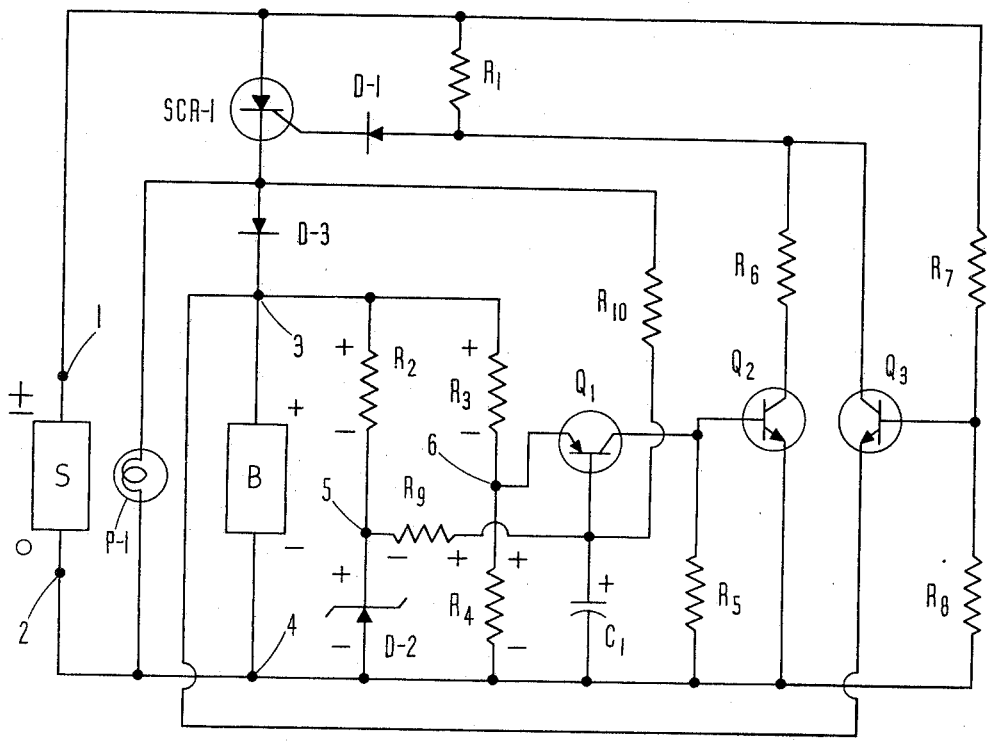
FIG. 6 is a schematic wiring diagram of a battery charging circuit in accordance with another embodiment of my invention for charging a battery in accordance with the process illustrated in FIG. 5.

FIG. 6 shows a battery charger in accordance with the second embodiment of my invention for charging a battery in accordance with the process illustrated in connection with FIG. 5. The parts corresponding in structure and function to those shown in FIG. 3 are given corresponding reference numerals.

As in the circuit of FIG. 3, the circuit of FIG. 6 comprises a pair of terminals 1 and 2 across which a source S is to be connected. The source S may be any suitable source of repetitive pulses making the terminal 1 periodically positive with respect to the terminal 2, such as an alternating current source, a rectified alternating current source, or the like. The apparatus is also provided with a pair of terminals 3 and 4, adapted to be connected to the positive and negative terminals, respectively, of a battery B to be charged.

The terminal 1 is connected to the anode of a silicon controlled rectifier SCR1. The cathode of the silicon controlled rectifier is connected to the terminal 3 through a diode D3. The purpose of the diode will be described below. Preferably, a pilot light P1 is connected between the cathode of the controlled rectifier SCR1 and the battery supply terminal 4.

As in the apparatus of FIG. 3, a voltage sensing bridge circuit, comprising three resistors R2, R3 and R4 and a Zener diode D2, is connected across the terminals 3 and 4. The output terminal 6 of the bridge is directly connected to the emitter of a transistor Q1 corresponding to the transistor Q1 in FIG. 3. However, the terminal 5 of the bridge is connected to the base of the transistor Q1 through an additional resistor R9.

The base of the transistor Q1 is returned to the terminal 4 through a filter capacitor C1 that serves to smooth out ripples from the source. An additional resistor R10 is connected between the base of the transistor Q1 and the cathode of the controlled rectifier SCR1 for reasons to appear.

As in the circuit of FIG. 3, an npn transistor Q2 has its base connected to the collector of the transistor Q1. This junction is connected to the terminal 4 through the resistor R5. The collector circuit path for the transistor Q2, comprising the resistors R1 and R6, is the same as described in connection with FIG. 3, and the gate circuit for the controlled rectifier SCR1, comprising the resistor R1 and the diode D1, is the same as described in connection with FIG. 3. Short circuit protection is provided by the transistor Q3 and the resistors R7 and R8 in the manner described in connection with FIG. 3.

In accordance with this embodiment of my invention, the resistors R2, R3 and R4, and the value of the breakdown voltage of the diode D2, are selected to that the potential across the terminals 5 and 6 of the bridge will be substantially equal when the battery voltage is slightly below the potential $E_5$ in FIG. 5, and the terminal 6 will become positive with respect to the terminal 5 when the battery voltage equals $E_5$.

The operation of the apparatus of FIG. 6 will be considered on the assumption that a substantially discharged battery B is connected across the terminals 3 and 4 and the source S is connected across the terminals 1 and 2. Each time the terminal 1 of the source S goes positive with respect to the terminal 2, the controlled rectifier SCR1 will be gated on by gate current flowing through the resistor R1 and the diode D1, and the controlled rectifier SCR1 will conduct a pulse between its anode and cathode to charge the battery B through the diode D3. At the same time, current will flow through the pilot light P1, causing it to be lit and indicate that the charger is supplying current. Assuming that the battery has a normal potential, although below the potential $E_5$ in FIG. 5, the transistor Q3 will be cut off.

With the battery voltage below $E_5$, the potential at terminal 6 of the bridge will be below the potential at terminal 5, an the transistors Q1 and Q2 will accordingly be cut off. The current through the controlled rectifier SCR1 will also flow through the resistors R10 and R9, and through the Zener diode D2 back to the source terminal 2. The voltage drop across the resistor R9 will be added to the potential at the terminal 5, so that the base of the transistor Q1 will be biased above the emitter. The values of the resistors R9 and R10 are selected so that this additional bias voltage will be equal to the difference between the voltages $E_3$ and $E_6$ in FIG. 5.

The capacitor C1, being selected essentially to filter the ripples from the source, will have a capacitance selected to charge to substantially constant voltage after a few cycles of conduction of the rectifier SCR1. If desired, a Zener diode can be used in place of the capacitor C1 to serve the same purpose of providing a relatively constant reference voltage.

Charging of the battery will continue with a supply of constant current pulses at constant frequency from the source S, until the potential of the battery B rises to the potential $E_3$. The emitter of the transistor Q1 will now be forward-biased with respect to the base, and the transistor Q1 will conduct.

When the transistor Q1 goes into conduction, the voltges at its collector will rise and turn on the transistor Q2, bringing the potential at the junction of the resistors R1 and R6 down below the potential of the cathode of the controlled rectifier SCR1, so that it will be turned off. Charging will then be interrupted, and the pilot light P1 will be extinguished. It will be noted that the diode D3 prevents the pilot light from being lit by the battery B, and also prevents the battery from supplying a current through the resistors R9 and R10.

While the charging supply is cut off, and the battery potential is falling, first to the potential $E_4$ and then more gradually toward $E_5$, the capacitor $C_1$ will be discharged and the emitter-base voltage on the transistor Q1 will become substantially the voltage difference between the terminals 5 and 6 of the bridge connected across the battery B. In this state of the apparatus, the transistor Q1 will remain forward-biased until the voltage across the terminal of the battery B falls to the lower value $E_5$. Thus, during this time the transistor Q1 and the transistor Q2 will both conduct, and the controlled rectifier SCR1 will be held at its non-conducting state.

When the voltage does fall to the value $E_5$, the transistor Q1 will be reverse-biased and will cut off. The transistor Q2 will then be cut off, and will allow the controlled rectifier SCR1 to be gated on when the source terminal 1 goes positive.

Each such positive pulse at terminal 1 will cause charging of the battery B through the controlled rectifier SCR1, while the voltage rises across the battery terminals until it again reaches $E_3$. As described above, during this interval, the voltage at the base of the transistor Q1 will be held above the emitter voltage by the drop across the resistor R9. It will be apparent that the apparatus will continue to cycle in the manner illustrated in FIG. 5 until an equilibrium charging rate is reached. Should the terminals 3 and 4 be shorted or brought so close together in potential that the voltage at the terminal 3 goes below the voltage of the junction of the resistors R7 and R8, the transistor Q3 will conduct as described in connection with FIG. 3, protecting the controlled rectifier SCR1.

A particular advantage of the circuit of FIG. 6 is that close regulation of the source S is not essential. If the source voltage rises above the nominal value, the voltage across the resistor R9 that determines the cutoff potential $E_3$ in FIG. 5 will also increase, as is appropriate in view of the larger charging current available from the source. Similarly, if the source voltage drops, the voltage $E_3$ will be adjusted downwardly to a value corresponding to the lower charging current available from the source. Thus, expensive voltage control apparatus is not needed.

While I have described my invention with respect to the details of various illustrative embodiments thereof, many changes and variations will occur to those skilled in the art upon reading my description, and such can obviously be made without departing from the scope of my invention.

Having thus described my invention, what I claim is:

1. Apparatus for charging a storage battery, comprising a pair of input terminals adapted to be connected to a source of charging voltage, a pair of output terminals adapted to be connected to a battery to be charged, an electronic switch connected between said input and output terminals and effective when closed to connect said input terminals to said output terminals, voltage sensing means connected across said output terminals for producing a first signal in accordance with the voltage across said output terminals, circuit means controlled by said electronic switch when closed for producing a second signal, switching means operable to a first state and a second state, means controlled by said switching means in its first state and charging voltage applied to said input terminals for closing said electronic switch to apply voltage to said output terminals, means controlled by said switching means in its second state for opening said electronic switch, and summing means effective when charging voltage is supplied to said input terminals and a battery is connected to said output terminals, said summing means being controlled by said electronic switch, said voltage sensing means, and said circuit means for setting said switching means to its first state when said electronic switch is open and the battery voltage is below a first predetermined value less than the gassing point of the battery, and for setting said switching means to its second state when said electronic switch is closed and the battery voltage is above a predetermined potential above said first predetermined value.

2. Apparatus for charging a storage battery, comprising a pair of input terminals adapted to be connected to a source of charging voltage, a pair of output terminals adapted to be connected to a battery to be charged, an electronic switch connected between said input terminals and said output terminals in a path closed when said switch is closed to supply voltage applied to said input terminals to said output terminals, voltage sensing means connected across said output terminals for producing a signal in accordance with the voltage of a battery connected across said output terminals, means controlled by said electronic switch and said voltage sensing means and effective when the voltage of a battery connected across said terminals is below a predetermined value less than the gassing point of the battery for closing said electronic switch, and signal biasing means effective when said electronic switch is closed for holding it closed until said signal rises to a value corresponding to a battery voltage above the gassing point.

3. In combination with a pair of input terminals adapted to be connected to a source of alternating voltage, a pair of output terminals adapted to be connected to a battery to be charged from said source, and a rectifying switch connected in series with said input and output terminals and effective when closed to supply rectified pulses of charging current to a battery connected to said output terminals from an alternating source connected to said input terminals, a switch control circuit effective when an alternating source is connected to said input terminals and a battery is connected to said output terminals comprising voltage sensing means connected between said output terminals for producing a first signal in accordance with the voltage of the battery, circuit means controlled by said switch for producing a second signal when said switch is closed, and switch actuating means controlled by said switch, said circuit means and said voltage sensing means for closing said switch when it is open and the battery voltage falls to a predetermined level below the gassing point and holding the switch closed until the battery voltage rises to a predetermined level above the gassing point.

4. The apparatus of claim 3, in which said switch comprises a controlled rectifier having a cathode and an anode connected in series with said input and output terminals, said rectifier having a gate terminal, and in which said switch actuating means comprises a biasing circuit for said gate terminal, said apparatus further comprising switching means controlled by the voltage between said output terminals for connecting said gate terminal to the input terminal which is negative when the anode of the controlled rectifier is positive when the output terminal voltage falls substantially below the nominal potential of the battery, whereby the controlled rectifier is protected when the output terminals are short-circuited.

5. A charging circuit for supplying pulses of charging current from a source of current to a battery in dependence on the needs of the battery, comprising input terminals adapted to be connected to a source of current, output terminals adapted to be connected to a battery, an electronic switch connected in series with said terminals and effective when closed to supply current from a source connected to the input terminals to a battery connected to the output terminals, and a switch control circuit effective when the charging circuit is connected between a source of current and a battery, said switch control circuit comprising a voltage sensing bridge circuit having input terminals connected across said output terminals and comprising, as one arm connected between said output terminals, a Zener diode connected to oppose the flow of current from the battery and having a breakdown voltage that is relatively small in comparison with the battery voltage and a first resistor connected in series with said diode and having a value large enough to maintain substantially constant breakdown current through the diode over the normal range of battery voltages to be encountered, said bridge circuit having a second arm comprising second and third resistors connected in series between said output terminals and having values selected to balance the potential between output terminals of the bridge at the junction of said first resistor and said diode and said second and third resistors when the battery has a predetermined voltage, and switch actuating means connected to the output terminals of said bridge for closing said switch when the bridge is unbalanced by an excursion of the battery voltage below said predetermined valve, said switch actuating means comprising a fourth resistor having one terminal connected to one of the bridge output terminals, means responsive to the voltage between the other terminal of said fourth resistor and the other output terminal of the bridge for closing the switch at a predetermined value of that voltage, and means energized by the source when the switch is closed for supplying current to said fourth resistor to offset the bridge output signal when the switch is closed to hold the switch closed until the battery voltage rises to a second value above said predetermined value.

References Cited

UNITED STATES PATENTS

| | | | |
|---|---|---|---|
| 3,300,703 | 1/1967 | Gold et al. | 320—46 |
| 3,328,663 | 6/1967 | Kagan | 320—46 X |
| 3,281,638 | 10/1966 | Crawford | 320—40 |
| 3,305,755 | 2/1967 | Walsh | 320—40 |
| 3,310,724 | 3/1967 | Grafham | 320—39 |
| 3,382,425 | 5/1968 | Legatti | 320—32 |

LEE T. HIX, Primary Examiner

S. WEINBERG, Assistant Examiner

U.S. Cl. X.R.

320—21, 40